June 29, 1948.  F. C. THORN ET AL  2,444,119

PACKING RING

Filed Aug. 11, 1945

INVENTORS
Frederick C. Thorn
Robert M. Waples
BY
Fraser, Myers & Manley
ATTORNEYS Patented June 29, 1948

2,444,119

UNITED STATES PATENT OFFICE 2,444,119

PACKING RING

Frederick C. Thorn and Robert M. Waples, Palmyra, N. Y., assignors to The Garlock Packing Company, Palmyra, N. Y., a corporation of New York Application August 11, 1945, Serial No. 610,288

5 Claims. (Cl. 286—26)

The present invention relates to endless elastic compressible packing rings and aims to provide certain improvements therein.

In recent years endless elastic compressible packing rings of circular cross section and known as O rings have come into extensive use in hydraulic equipment of military aircraft. In use, the O ring is mounted in an annular groove of greater width than the ring when under compression, so that the ring will have a limited rolling or oscillating movement within the groove as the packed parts are moved axially relatively to one another. It is contended by the sponsors of said O rings that the rolling or oscillating movement produces a so-called kneading action which serves to keep the elastic material alive and prolong its life. Although these O rings have met with considerable favor in their field of use and have replaced, to a large extent, rings of other types, in actual service, however, over a period of time, they have not come up to the earlier expectations of their sponsors and users, because of ring failures in many assemblies containing them. Failure of these O rings in service appears to be due to internal stresses set up in the rings at the time of applying them to the equipment, at the time of assembling the equipment, or as a result of the oscillation of the rings when the equipment is operating, or to a combination of said stresses. This will be apparent from a consideration of the fact that in order to apply an O ring to a machine part, the ring in some instances must be extended or stretched over said part and rolled into place in the ring groove. In this operation the ring becomes twisted unless great care is taken to insure that it is rolled evenly around its entire periphery. However, even if the ring is located in the groove properly and without twisting, the ring may become twisted at the time of assembling the equipment or the oscillation of the ring when the equipment is operating may not be equal throughout its circumference, in which event a twisting action results. Regardless of the cause, in many cases the ring does not function properly and ultimately is destroyed. These failures have been termed "spiral failures."

We have determined by tests that these "spiral failures" can be eliminated by employing endless rings having concentric cylindrical surfaces for engagement with the cylinder wall or rod and with the base of the groove respectively and with opposite end faces to admit fluid pressure to one side so as to put the entire ring under fluid pressure and thereby make it fluid tight along the opposite end face and the wear face where the escaping pressure must necessarily be lower. Rings of octagonal cross-section are admirably suited for this purpose although rings of other polygonal cross-section may also be used.

Moreover, such rings of polygonal cross-section and particularly of octagonal cross-section possess manufacturing advantages over the O rings. Some of the advantages are:

(1) A ring having concentric cylindrical surfaces can be slid into place in the groove and therefore does not become twisted during application;

(2) A ring having concentric cylindrical surfaces does not twist in service because it does not roll back and forth as may the O ring;

(3) A ring having concentric cylindrical surfaces provides a more positive seal against leakage than the O ring because it presents, without distortion, a greater wearing surface than the O ring;

(4) From a manufacturing standpoint rings of polygonal cross-section and particularly of hexagonal and octagonal cross-section are much less expensive than the O ring because they can be lathe cut, if desired, whereas the O ring must be molded, requiring a substantial initial investment in molds, with additional upkeep and expense;

(5) A molded O ring has a ridge around the periphery of the ring which is the flash that squeezes out between the male and female portions of the mold and is common to all molded rings, which flash is on the contact surfaces of the ring and therefore must be removed by grinding, and unless the griding is done with extreme accuracy, the wearing surface of the ring will be uneven and will not seal properly.

Packing rings with concentric cylindrical surfaces as contemplated by the present invention can also be molded, and where such practice is followed the flash can be confined to one end of the cylindrical faces and can be removed therefrom by grinding or otherwise without affecting the cylindrical contour or seating surfaces of the rings.

In view of the objections to the O ring and the advantages thereover of a ring having concentric cylindrical surfaces, the question which naturally presents itself is why an endless ring of square or rectangular cross-section would not solve the problem. The primary reason militating against the use of a ring of rectangular cross-section, is that in use, it is important that there be a film of lubricant between the packing ring and the wear face which it contacts and a rectangular ring tends to wipe the lubricant from such wear face as it travels back and forth. In contradistinction to the wiping action provided by a ring of rectangular cross-section, with a ring of polygonal cross section the beveled sides of the ring adjacent the contact side, form little pockets with the wear face of the equipment in which the lubricant accumulates and eventually finds its way between the wearing surface of the ring and the wear face of the equipment as the ring slides in the groove and is moved first in one direction, and then in the other.

With respect to a ring of polygonal cross section of more than eight sides, it is evident that it closely approaches an O ring in cross section, especially with rings of small cross sectional dimensions. Moreover, such ring would be more costly to cut on a lathe. By the same token, a ring of flat elliptical cross section also lacks the desirable features of a ring of hexagonal or octagonal cross section, since a ring of elliptical cross section would be subject to the objections inherent in the O ring when mounting the same and in use, and, furthermore, to produce such an elliptical ring, molds would be required, and the molded ring would have the same objectionable flash as the O ring.

In the light of the foregoing, the construction and operation of packing rings coming within the scope of the present invention will be readily understood from the following description when considered in connection with the accompanying drawings showing certain preferred embodiments of our invention, and wherein.

Figure 1:
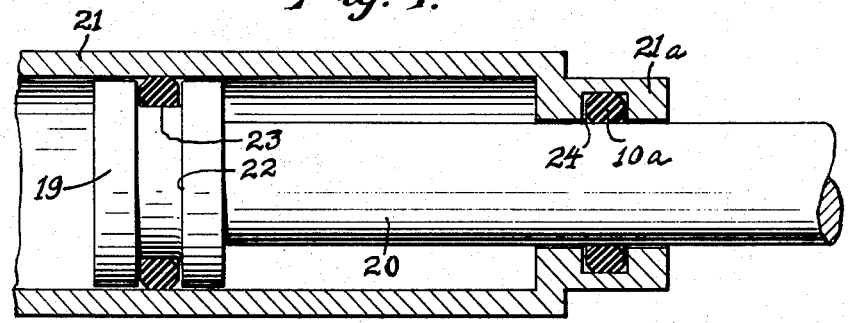
Figure 1 is an axial section through a piston and cylinder equipped with packing rings embodying our invention.
Figure 2:
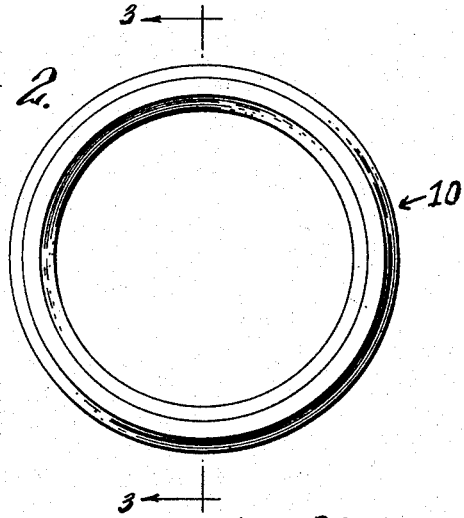
Figure 2 is a side elevation of an octagonal ring embodying our invention.
Figure 3:
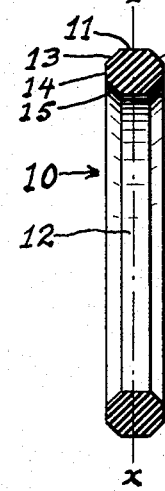
Figure 3 is a section taken substantially along the plane of the line 3—3 of Figure 2.

Referring first to Figs. 1 to 3 of the drawings, our invention is shown as consisting of an endless elastic deformable packing ring 10 of octagonal form in radial cross section, said ring having concentric cylindrical surfaces 11 and 12, and lateral sides 13, 14, 15, 16, 17 and 18, the ring being substantially symmetrical with respect to a median plane x—x passing through the cylindrical surfaces. The packing ring 10 is shown in Fig. 1 as applied to provide a sliding packed joint between relatively movable members of a fluid pressure mechanism comprising a piston 19 carried by a piston rod 20, the piston and piston rod being adapted to move axially respectively within a cylinder 21 having a reduced neck portion 21a.

The piston 19 is formed with an annular groove 22 having a cylindrical base 23 concentric with the axis of the piston and within which groove the packing ring 10 is mounted and compressed radially to provide a sliding packed joint with the inner wall of the cylinder 21. The width of the groove is somewhat greater than the axial dimension of the packing ring when compressed therein, so that, as the piston and cylinder move relatively to one another, the ring will have a limited movement in the groove. An analogous packed ring arrangement but in a reverse position may be employed between the piston rod 20 and the cylindrical neck 21a of the cylinder, as shown by the packing ring 10a mounted in the annular groove 24.

Figure 4:
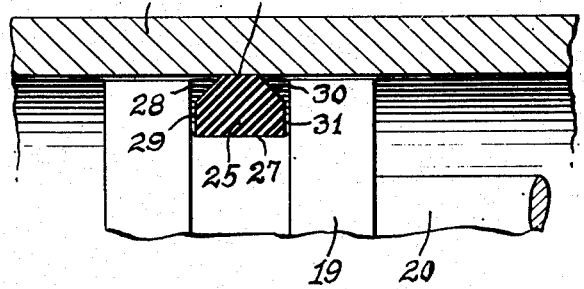
Figure 4 is a partial axial section through a piston and cylinder equipped with a modified form of packing ring coming within the scope of our invention.

In Fig. 4 we have shown our invention as embodying a packing ring of hexagonal cross section mounted within the groove in the piston. In this embodiment, as in Figs. 1 to 3, the ring 25 has concentric cylindrical surfaces 26 and 27 for engaging the inner wall of the cylinder and the base of the groove in the piston respectively, and the ring is symmetrical with respect to a median plane passing through the cylindrical surfaces. The ring 25 has lateral sides 28, 29, 30 and 31, the faces 28 and 30 of which form obtuse angles with the cylindrical face 26 and provide with the wear face of the machine element little pockets in which lubricant, which is usually present at the sliding contacting faces of the packing and the metallic member, accumulates and eventually finds its way between the wearing surfaces when the equipment is in operation under pressure, and the ring after limited sliding movement is subjected to shear or distortion upon the admission of fluid pressure on one side, so as to put the entire ring under this pressure and thereby make it fluid tight along the opposite end face and the wear face where the escaping fluid pressure must necessarily be lower. A similar obtuse angular relationship and lubricant pocket formations exist in the packing ring installations of Fig. 1. With a hexagonal ring as shown in Fig. 4, it will be appreciated that a limited shear or distortion will take place at the outer periphery of the ring even though the ring at its inner periphery is confined within the groove and incapable of sliding movement.

Preferably the depth or width of the working face and base of the packing ring before installation shall each be not less than 40% of the corresponding dimensions of the packing space. This depth, in conjunction with a material of reasonable stiffness, should be sufficient to prevent rocking of the ring. A regular octagon or half octagon, i. e., a hexagon as shown in Fig. 4 respond to this requirement.

It is also preferable that the angle between the wear face of the machine element extended and the sides of the packing ring adjacent either side of the wear face of the packing ring shall not be greater than approximately 60° to secure the oil wedge effect. This it will be appreciated admits the regular octagon, the regular hexagon and also the extra deep decagon, but does not admit the rectagonal. As a corollary to this, the angle between the working face of the packing ring and the adjacent lateral sides of the ring in use should be no less than approximately 120°.

It is also to be noted that a ring of regular polygonal cross section responding to the various limitations hereinbefore recited is better adapted for the present invention because for stock of given stiffness it is more deformable than rings of irregular cross section, since the former permit of a greater degree of initial interference with the wear face of the equipment in which it is adapted for use. Furthermore a ring of regular polygonal cross section can be used either as a rod or a piston packing.

Although we have shown and described only two specific embodiments of packing rings, it will be understood that the packing rings of our invention may have any polygonal form in radial cross section provided they have concentric cylindrical surfaces, one for seating on the base of the annular groove or channel and the other for making a sliding packed joint, and that the latter surface forms obtuse angles with the adjacent lateral sides of the ring. We prefer, however, that the packing ring in radial cross section be in the form of a polygon having more than four and less than ten sides.

What we claim is:

1. In a fluid pressure mechanism, a pair of relatively movable members, one of said members having an annular groove therein of generally rectangular cross-section with a cylindrical wall concentric with the axis of motion of the relatively movable members, an endless elastic deformable packing ring of less width than said groove in said annular groove and forming a sliding packed joint with the other member, said packing ring having concentric cylindrical surfaces and lateral sides which form obtuse angles with the cylindrical wear surface of the packing at the ends of said wear surface.

2. A fluid pressure mechanism according to claim 1 wherein the packing ring in radial cross section is a polygon and the lateral sides of the ring adjacent the cylindrical wear surface form with said surface obtuse angles of not less than approximately 120°.

3. A fluid pressure mechanism according to claim 1 wherein the packing ring in radial cross section is a polygon, the width of the cylindrical working face of the ring being not less than approximately 40% of the width of the packing space.

4. A fluid pressure mechanism according to claim 1 wherein the packing ring in radial cross section is a polygon having more than four and not more than ten sides and is substantially symmetrical with respect to a median plane passing through the cylindrical surfaces of the ring.

5. A fluid pressure mechanism according to claim 1 wherein the normal radial cross section of the packing ring is octagonal in form, and said packing ring is substantially symmetrical with respect to a median plane passing through the cylindrical faces.

FREDERICK C. THORN.
ROBERT M. WAPLES.

REFERENCES CITED

The following references are of record in the file of this patent:

UNITED STATES PATENTS

| Number | Name | Date |
|---|---|---|
| 1,482,141 | Parks | Jan. 29, 1924 |
| 2,136,835 | Begg | Nov. 15, 1938 |
| 2,186,664 | Brown | Jan. 9, 1940 |
| 2,208,620 | Baisch | July 23, 1940 |
| 2,295,823 | Banigan et al. | Sept. 15, 1942 |
| 2,394,364 | Christensen | Feb. 5, 1946 |